(12) United States Patent
Egan, Jr. et al.

(10) Patent No.: US 8,286,209 B2
(45) Date of Patent: Oct. 9, 2012

(54) MULTI-PORT ENTRY ADAPTER, HUB AND METHOD FOR INTERFACING A CATV NETWORK AND A MOCA NETWORK

(75) Inventors: John M. Egan, Jr., Franktown, CO (US); Chad T. Wells, Highlands Ranch, CO (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 924 days.

(21) Appl. No.: 12/255,008

(22) Filed: Oct. 21, 2008

(65) Prior Publication Data
US 2010/0100918 A1    Apr. 22, 2010

(51) Int. Cl.
*H04N 7/18*    (2006.01)
*H04N 7/173*   (2011.01)
*H04N 7/16*    (2011.01)

(52) U.S. Cl. ............... 725/74; 725/78; 725/79; 725/80; 725/81; 725/82; 725/127; 725/149

(58) Field of Classification Search .......... 725/74, 725/78–82, 119, 127–129, 149
See application file for complete search history.

(56) References Cited

U.S. PATENT DOCUMENTS

| | | |
|---|---|---|
| 3,790,909 A | 2/1974 | Le Fevre |
| 3,939,431 A | 2/1976 | Cohlman |
| 4,027,219 A | 5/1977 | Van Alphen et al. |
| 4,306,403 A | 12/1981 | Hubbard et al. |
| 4,344,499 A | 8/1982 | Van Der Lely et al. |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,840 A | 6/1992 | Dufresne et al. |
| 5,214,505 A | 5/1993 | Rabowsky et al. |
| 5,231,660 A | 7/1993 | West, Jr. |
| 5,369,642 A | 11/1994 | Shioka et al. |
| 5,485,630 A | 1/1996 | Lee et al. |

(Continued)

FOREIGN PATENT DOCUMENTS

JP    55080989 A    6/1980

(Continued)

OTHER PUBLICATIONS

PCT/US2010/049568 International Search Report May 31, 2011.

(Continued)

*Primary Examiner* — Kristine Kincaid
*Assistant Examiner* — Gigi L Dubasky
(74) *Attorney, Agent, or Firm* — Schmeiser, Olsen & Watts LLP

(57) ABSTRACT

A cable television (CATV) entry adapter interfaces to a CATV network and serves as a hub in a Multimedia over Coax Alliance (MoCA) network. MoCA signals are bypassed around the CATV communication paths within the entry adapter to maintain adequate signal strength and to allow a passive port of the entry adapter to be used as part of the MoCA network. MoCA signals are suppressed from exiting the CATV entry adapter onto the CATV network.

15 Claims, 5 Drawing Sheets

U.S. PATENT DOCUMENTS

| | | | |
|---|---|---|---|
| 5,548,255 | A | 8/1996 | Spielman |
| 5,557,319 | A | 9/1996 | Gurusami et al. |
| 5,557,510 | A | 9/1996 | McIntyre et al. |
| 5,719,792 | A * | 2/1998 | Bush .......................... 702/190 |
| 5,740,044 | A | 4/1998 | Ehrenhardt et al. |
| 5,745,836 | A | 4/1998 | Williams |
| 5,815,794 | A | 9/1998 | Williams |
| 5,818,825 | A | 10/1998 | Corrigan et al. |
| 5,839,052 | A | 11/1998 | Dean et al. |
| 5,893,024 | A | 4/1999 | Sanders et al. |
| 5,937,330 | A | 8/1999 | Vince et al. |
| 5,950,111 | A | 9/1999 | Georger et al. |
| 5,970,053 | A | 10/1999 | Schick et al. |
| 6,012,271 | A | 1/2000 | Wilkens et al. |
| 6,014,547 | A | 1/2000 | Caporizzo et al. |
| 6,049,693 | A | 4/2000 | Baran et al. |
| 6,069,960 | A | 5/2000 | Mizukami et al. |
| 6,094,211 | A | 7/2000 | Baran et al. |
| 6,101,932 | A | 8/2000 | Wilkens |
| 6,128,040 | A | 10/2000 | Shinbori et al. |
| 6,129,187 | A | 10/2000 | Bellanger et al. |
| 6,173,225 | B1 | 1/2001 | Stelzle et al. |
| 6,185,432 | B1 | 2/2001 | Vembu |
| 6,205,138 | B1 | 3/2001 | Nihal et al. |
| 6,348,837 | B1 | 2/2002 | Ibelings |
| 6,348,955 | B1 | 2/2002 | Tait |
| 6,373,349 | B2 | 4/2002 | Gilbert |
| 6,377,316 | B1 | 4/2002 | Mycynek et al. |
| 6,388,539 | B1 | 5/2002 | Rice |
| 6,425,132 | B1 | 7/2002 | Chappell |
| 6,430,904 | B1 | 8/2002 | Coers et al. |
| 6,495,998 | B1 | 12/2002 | Terreault |
| 6,498,925 | B1 | 12/2002 | Tauchi |
| 6,510,152 | B1 | 1/2003 | Gerszberg et al. |
| 6,546,705 | B2 | 4/2003 | Scarlett et al. |
| 6,560,778 | B1 | 5/2003 | Hasegawa |
| 6,570,928 | B1 | 5/2003 | Shibata |
| 6,587,012 | B1 | 7/2003 | Farmer et al. |
| 6,622,304 | B1 | 9/2003 | Carhart |
| 6,640,338 | B1 | 10/2003 | Shibata |
| 6,678,893 | B1 | 1/2004 | Jung |
| 6,683,513 | B2 | 1/2004 | Shamsaifar et al. |
| 6,725,462 | B1 | 4/2004 | Kaplan |
| 6,728,968 | B1 | 4/2004 | Abe et al. |
| 6,757,910 | B1 | 6/2004 | Bianu |
| 6,758,292 | B2 | 7/2004 | Shoemaker |
| 6,804,828 | B1 | 10/2004 | Shibata |
| 6,843,044 | B2 | 1/2005 | Clauss |
| 6,845,232 | B2 | 1/2005 | Darabi |
| 6,868,552 | B1 | 3/2005 | Masuda et al. |
| 6,877,166 | B1 | 4/2005 | Roeck et al. |
| 6,920,614 | B1 | 7/2005 | Schindler et al. |
| 6,928,175 | B1 | 8/2005 | Bader et al. |
| 6,942,595 | B2 | 9/2005 | Hrazdera |
| 7,003,275 | B1 | 2/2006 | Petrovic |
| 7,029,293 | B2 | 4/2006 | Shapson et al. |
| 7,039,432 | B2 | 5/2006 | Strater et al. |
| 7,048,106 | B2 | 5/2006 | Hou |
| 7,127,734 | B1 | 10/2006 | Amit |
| 7,162,731 | B2 | 1/2007 | Reidhead et al. |
| 7,254,827 | B1 | 8/2007 | Terreault |
| 7,283,479 | B2 | 10/2007 | Ljungdahl et al. |
| 7,399,255 | B1 | 7/2008 | Johnson et al. |
| 7,404,355 | B2 | 7/2008 | Viaud et al. |
| 7,416,068 | B2 | 8/2008 | Ray et al. |
| 7,454,252 | B2 | 11/2008 | El-Sayed |
| 7,464,526 | B2 | 12/2008 | Coenen |
| 7,505,819 | B2 | 3/2009 | El-Sayed |
| 7,530,091 | B2 | 5/2009 | Vaughan |
| 7,675,381 | B2 * | 3/2010 | Lin ................................ 333/101 |
| 7,742,777 | B2 | 6/2010 | Strater et al. |
| 2001/0016950 | A1 | 8/2001 | Matsuura |
| 2002/0141347 | A1 | 10/2002 | Harp et al. |
| 2002/0144292 | A1 | 10/2002 | Uemura et al. |
| 2002/0166124 | A1 | 11/2002 | Gurantz et al. |
| 2002/0174423 | A1 * | 11/2002 | Fifield et al. ...................... 725/1 |
| 2003/0084458 | A1 | 5/2003 | Ljungdahl et al. |
| 2004/0147273 | A1 | 7/2004 | Morphy |
| 2004/0172659 | A1 | 9/2004 | Ljungdahl et al. |
| 2004/0229561 | A1 | 11/2004 | Cowley et al. |
| 2005/0034168 | A1 | 2/2005 | Beveridge |
| 2005/0047051 | A1 | 3/2005 | Marland |
| 2005/0144649 | A1 | 6/2005 | Bertonis et al. |
| 2005/0183130 | A1 | 8/2005 | Sadja et al. |
| 2005/0283815 | A1 | 12/2005 | Brooks et al. |
| 2005/0289632 | A1 | 12/2005 | Brooks et al. |
| 2006/0015921 | A1 | 1/2006 | Vaughan |
| 2006/0041918 | A9 | 2/2006 | Currivan et al. |
| 2006/0191359 | A1 | 8/2006 | Tarasinski et al. |
| 2006/0205442 | A1 | 9/2006 | Phillips et al. |
| 2006/0241838 | A1 | 10/2006 | Mongiardo et al. |
| 2006/0282871 | A1 | 12/2006 | Yo |
| 2007/0288981 | A1 | 12/2007 | Mitsuse et al. |
| 2007/0288982 | A1 | 12/2007 | Donahue |
| 2008/0022344 | A1 | 1/2008 | Riggsby |
| 2008/0040764 | A1 | 2/2008 | Weinstein et al. |
| 2008/0120667 | A1 | 5/2008 | Zaltsman |
| 2008/0127287 | A1 | 5/2008 | Alkan et al. |
| 2008/0168518 | A1 | 7/2008 | Hsue et al. |
| 2008/0247401 | A1 | 10/2008 | Bhal et al. |
| 2008/0247541 | A1 | 10/2008 | Cholas et al. |
| 2008/0271094 | A1 * | 10/2008 | Kliger et al. ..................... 725/80 |
| 2008/0313691 | A1 | 12/2008 | Cholas et al. |
| 2009/0031391 | A1 | 1/2009 | Urbanek |
| 2009/0047917 | A1 | 2/2009 | Phillips et al. |
| 2009/0077608 | A1 * | 3/2009 | Romerein et al. ............. 725/127 |
| 2009/0165070 | A1 * | 6/2009 | McMullin et al. ............. 725/125 |
| 2009/0320086 | A1 * | 12/2009 | Rijssemus et al. ............. 725/127 |
| 2010/0017842 | A1 | 1/2010 | Wells |
| 2010/0095344 | A1 | 4/2010 | Newby et al. |
| 2010/0225813 | A1 | 9/2010 | Hirono et al. |
| 2011/0072472 | A1 | 3/2011 | Wells et al. |
| 2012/0054805 | A1 | 3/2012 | Shafer et al. |
| 2012/0054819 | A1 | 3/2012 | Alkan et al. |

FOREIGN PATENT DOCUMENTS

| | | |
|---|---|---|
| JP | 55132126 | 10/1980 |
| JP | 55132126 A | 10/1980 |
| JP | 57091055 | 6/1982 |
| JP | 57091055 A | 6/1982 |
| JP | 58101582 U | 6/1983 |
| JP | 58-99913 | 7/1983 |
| JP | 05899913 | 7/1983 |
| JP | 59026709 | 8/1984 |
| JP | 61157035 | 7/1986 |
| JP | 61157035 A | 7/1986 |
| JP | 05191416 A | 7/1993 |
| JP | 07038580 A | 2/1995 |
| JP | 11069334 | 3/1999 |
| JP | 11069334 A | 3/1999 |
| JP | 2001177580 A | 6/2001 |
| JP | 2004080483 A | 3/2004 |
| JP | 2005005875 A | 1/2005 |
| JP | 2007166109 A | 6/2007 |
| JP | 2007166110 A | 6/2007 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

OTHER PUBLICATIONS

Office Action (Mail Date: Jan. 23, 2012 for U.S. Appl. No. 12/250,229, filed Oct. 13, 2008.

Office Action (Mail Date: Nov. 22, 2011 for U.S. Appl. No. 12/250,229, filed Oct. 13, 2008.

U.S. Appl. No. 13/167,497, filed Jun. 23, 2011.

U.S. Appl. No. 13/245,510, filed Sep. 26, 2011.

U.S. Appl. No. 13/333,060, filed Dec. 21, 2011.

* cited by examiner

MULTI-PORT ENTRY ADAPTER, HUB AND METHOD FOR INTERFACING A CATV NETWORK AND A MOCA NETWORK

CROSS REFERENCE TO RELATED APPLICATION

This invention incorporates herein by this reference, the subject matter of co-pending U.S. patent application Ser. No. 12/250,229, filed Oct. 13, 2008, titled Ingress Noise Inhibiting Network Interface Device and Method for Cable Television Networks, which is assigned to the assignee hereof.

FIELD OF THE INVENTION

This invention relates to cable television (CATV) networks and to Multimedia over Coax Alliance (MoCA) in-home entertainment networks. More particularly, the present invention relates to a new and improved interface between a CATV network and a MoCA network which maintains the privacy of MoCA data at the premises of one CATV subscriber or customer and prevents the MoCA data reaching premises of another CATV subscriber and/or interfering with the MoCA network functionality at the other premises, which allows all active and passive taps or connectors of a multi-tap CATV entry adapter to conduct the MoCA signals in the MoCA network, and which allows the multi-tap CATV entry adapter to be fully functional as a hub in the MoCA network within the subscriber premises, among other improvements.

BACKGROUND OF THE INVENTION

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (homes and offices) of subscribers to the CATV services. The downstream signals operate subscriber equipment, such as television sets, telephone sets and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VOIP) telephone sets use the CATV infrastructure and the public Internet as the communication medium for transmitting two-way telephone conversations.

To permit simultaneous communication of upstream and downstream CATV signals and the interoperability of the subscriber equipment and the equipment associated with the CATV network infrastructure outside of subscriber premises, the downstream and upstream signals are confined to two different frequency bands. The downstream frequency band is within the range of 54-1002 megahertz (MHz) and the upstream frequency band is within the range of 5-42 MHz, in most CATV networks.

The downstream signals are delivered from the CATV network infrastructure to the subscriber premises at an entry device, which is also commonly referred to as an entry adapter, terminal adapter or a drop amplifier. The entry device is usually a multi-port device which provides a multiplicity of ports or connectors for connecting coaxial cables. A separate coaxial cable is connected to each of the ports and extends within the subscriber premises to the location of the subscriber equipment. Typically, most homes have coaxial cables extending to cable outlets in almost every room, because different types of subscriber equipment may be used in different rooms. For example, television sets and computers may be present in many different rooms. One or more telephone sets are also commonplace in a home. The multiple ports on the entry device accommodate connections to the subscriber equipment so that the downstream signals are received at each cable outlet and upstream signals are conducted back through the premises coaxial cables to the entry device and from there as upstream signals on the CATV network.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. As a further example, receivers which receive satellite-broadcast signals may be distributed for viewing or listening throughout the home. These types of devices, including the more-conventional television sets, telephone sets and devices connected to the Internet by the CATV network, are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. The MoCA in-home network uses the subscriber premise or in-home coaxial cable infrastructure originally established for distribution of CATV signals within the subscriber premises, principally because that cable infrastructure already exists in most homes and is capable of carrying much more information than is carried in the CATV frequency bands. A MoCA network is established by connecting MoCA interface devices at the cable outlets in the rooms of the subscriber premises. The MoCA interface devices implement a MoCA communication protocol which encapsulates the signals normally used by the multimedia devices within MoCA signals and then communicate these MoCA signals between selected ones of the other MoCA interfaces devices connected at other cable outlets. The receiving MoCA interface device removes the encapsulated multimedia device signals, and delivers those to the connected display, computer or other multimedia device from which the content is presented.

Each MoCA interface device is capable of communicating with every other MoCA interface device in the MoCA network to deliver the multimedia content throughout the home or subscriber premises. The entertainment or multimedia content that is available from one multimedia device can be displayed, played or otherwise used at a different location within the home, without having to physically relocate the multimedia device from one location to another within the home. The in-home network communication of multimedia content is considered beneficial in more fully utilizing the multimedia devices present in modern homes.

Since the MoCA network may function simultaneously with the normal operation of the CATV services, the MoCA signals communicated between MoCA interface devices utilize a frequency range of 1125-1525 MHz. This so-called D band of MoCA signals is divided into eight different frequency ranges, D1-D8, and these eight different D frequency ranges are used to assure communication between the selected MoCA interface devices. For example, the D-1 band at 1125-1175 MHz may be used to communicate CATV television programming content between a MoCA interface device connected to a set-top box in a main room of the house and another MoCA interface device connected to a television set in bedroom of the house, while a MoCA interface device connected to a computer gaming multimedia device in a basement room of the house simultaneously communicates computer game content over the D-6 band at 1375-1425 MHz to a computer located in a recreation room of the house. The MoCA frequency band also includes other frequency ranges, but the D band is of the major relevance because of its principal use in establishing connections between the MoCA interface devices.

Although using the in-home coaxial cable as the principal communication medium substantially simplifies the implementation of the MoCA network, there are certain disadvantages to doing so. The D band MoCA frequencies have the capability of passing through the CATV entry device and entering the CATV network where they may then pass through a cable drop and enter an adjoining subscriber's premises. The presence of the MoCA signals at an adjoining subscriber's premises compromises the privacy and security of the information originally intended to be confined only within the original subscriber premises. The MoCA signals from the original subscriber premises which enter through the CATV network to adjoining subscriber premises also have the potential to adversely affect the performance of a MoCA network in the adjoining subscriber premises. The conflict of the signals from the original and adjoining subscriber premises may cause the MoCA interface devices to malfunction or not operate properly on a consistent basis.

CATV networks are subject to adverse influences from so-called ingress noise which enters the CATV network from external sources, many of which are located at the subscriber premises. The typical range of ingress noise is in the frequency band of 0-15 MHz, but can also exist in other upstream or downstream frequencies. Ingress noise mitigation devices have been developed to suppress or reduce ingress noise from the subscriber premises before it enters the CATV network. The D bands in the MoCA frequency range are considerably outside the range of the normal ingress noise, and ingress noise suppression devices are ineffectual in inhibiting MoCA signals. MoCA signals, being outside of the CATV signal frequency, may also constitute another source of noise for the CATV network. Separate MoCA frequency rejection filters have been developed for external connection to CATV entry adapters. However, the use of such devices is subject to unauthorized removal, tampering, forgetfulness in original installation, and physical exposure which could lead to premature failure or malfunction.

Problems also arise because the CATV network and the in-home cable infrastructure were originally intended for the distribution of CATV signals to the cable outlets. The typical in-home cable infrastructure uses signal splitters to divide a single downstream signal into multiple downstream signals and to combine multiple upstream signals into a single upstream signal or band. Distribution of the CATV signals to and from the cable outlets occurs in this manner. The CATV cable infrastructure was not intended for communication between cable outlets, but to implement the MoCA communication protocol, the MoCA signals must traverse between the multiple cable outlets by communication through each splitter in a traversal process referred to as "splitter jumping."

The typical signal splitter has a high degree of signal rejection or isolation between its multiple output ports. When the MoCA signals jump the output ports of a splitter, the degree of signal rejection or isolation greatly diminishes the strength of the signals which effectively jump the output ports. The physical signal communication paths between the cable outlets is also highly variable because of the differences in the in-home cable infrastructure in most homes. The MoCA communication protocol recognizes the possibility of variable strength signals, and provides a facility to boost the strength of MoCA signals under certain circumstances. However, the substantial differences in the in-home cable infrastructure may nevertheless negatively impact the strength of the MoCA signals conducted.

One example of significant negative impact on MoCA signals arises from passive-active CATV entry adapters. Passive-active CATV entry adapters supply both passive CATV signals and amplified or active CATV signals at the subscriber premises for delivery to passive and active types of CATV subscriber equipment, respectively. Passive-active entry adapters include a splitter which essentially divides or branches the downstream signals from the CATV network into passive signals and into active signals. The passive signals are conducted through the entry adapter without amplification, conditioning or modification before they are delivered from a passive port to passive subscriber equipment, typically a voice modem of a "life-line" telephone set. Because life-line telephone services are intended to remain useful in emergency conditions, the functionality of the telephone set can not depend on the proper functionality of an amplifier or other active signal conditioner in the signal path. The active signals are conducted through a forward path amplifier, where the amplifier amplifies the strength of the signals or modifies or conditions some characteristic of the signals before delivery from active ports to active subscriber equipment. Because most subscriber equipment benefits from amplified signals, the majority of ports on a CATV entry adapter are active ports. Usually only one passive port is provided for each entry adapter.

In those situations where a CATV subscriber does not utilize the passive port for passive equipment, active equipment may be connected to the passive port and that active equipment may function properly if the strength of the signal from the passive port is sufficient. In other cases, the passive port simply may not be connected, and only the active ports of the CATV entry adapter are used.

Any attempt to connect the passive port as part of a MoCA network will not be successful, however, because the MoCA signals are severely diminished in signal strength when they pass from the active ports in a reverse direction through the forward path amplifier. The MoCA signals must pass in a reverse direction through the forward path amplifier to reach the splitter of the CATV entry adapter before the MoCA signals can jump the splitter and reach the passive port. Signal conductivity in the reverse direction through a forward path amplifier is simply not possible without severe attenuation. Thus, it is essentially impossible to use a passive port on a CATV entry adapter for connection in a MoCA network, because of inadequate MoCA signal strength. The level of attenuation is greater than can be overcome by adjusting the boost of the MoCA signals in accordance with the MoCA communication protocol.

SUMMARY OF THE INVENTION

The present invention is for a CATV entry adapter which beneficially contributes to the establishment of a MoCA in-home network. The CATV entry adapter of the present invention effectively permits its passive port, if unused by passive subscriber equipment, to be fully utilized and fully effective in a MoCA network without substantial MoCA signal degradation caused by reverse transfer through a forward signal amplifier. The forward signal amplification capability is retained for CATV signals, but is bypassed for MoCA signals in the D frequency band. Consequently, a single CATV entry adapter can be more effectively used as a hub for a MoCA network by allowing passive equipment to be connected to the passive port when used, and by allowing the passive port to be used as part of the MoCA network rather than requiring the use of a larger or different CATV entry adapter with more active ports. The present CATV entry adapter also prevents or greatly inhibits MoCA signals from exiting the MoCA network at the subscriber premises and entering the CATV network. By confining the MoCA signals to the MoCA network at the subscriber premises, the privacy and security of the information carried by the MoCA signals is not compromised, and spurious MoCA signals from one subscriber premises are not available over the CATV network to interfere with MoCA network established at another subscriber premises connected to the CATV network. The ability to prevent or inhibit the MoCA signals from entering the CATV network is an internal function of the CATV entry adapter which thereby shields that functionality from unauthorized removal, tampering, forgetfulness in original installation, and physical exposure. The rejection of the MoCA signals from entry onto the CATV network is better assured.

In accordance with these aspects, one summary of the invention is as follows. A cable television (CATV) entry adapter has an entry port and a passive port and a plurality of active ports by which to interface a CATV network connected at the entry port with subscriber equipment at subscriber premises connected at the active ports. The CATV entry adapter also functions as a hub in a Multimedia over Coax Alliance (MoCA) network to communicate MoCA signals between MoCA interface devices connected to the active and passive ports. The CATV entry device comprises a CATV passive signal communication path which conducts CATV signals between the passive port and the entry port, a CATV active downstream communication path which conducts CATV downstream signals between the entry port and the active ports, a CATV active upstream communication path which conducts CATV upstream signals between the active ports and the entry port, and a MoCA signal communication path which conducts MoCA signals around the CATV active downstream and upstream communication paths when communicating the MoCA signals from the MoCA interface devices at the active ports to each MoCA device connected to a passive port. The CATV entry adapter may also include a MoCA signal frequency rejection filter connected at the entry port to suppress the conduction of MoCA signals onto the CATV network.

Further in accordance with the above aspects, another summary of the invention is as follows. A method of using a cable television (CATV) entry adapter has a plurality of ports to interface CATV upstream signals and CATV downstream signals supplied from a CATV network with subscriber equipment at subscriber premises while simultaneously functioning as a hub in a Multimedia over Coax Alliance (MoCA) network. The MoCA network communicates MoCA signals between MoCA interface devices connected to multimedia devices. At least some of the multimedia devices include the subscriber equipment. The method comprises conducting CATV signals to and from the CATV entry adapter at an entry of one of the ports, conducting CATV passive signals from the CATV network in a CATV passive signal communication path through the CATV entry adapter to a passive one of the ports, conducting CATV downstream signals from the CATV network in a CATV active downstream signal communication path through the CATV entry adapter to a plurality of active ones of the ports, conducting CATV active upstream signals from the plurality of active ports in a CATV active upstream communication path through the CATV entry adapter to the port, conducting MoCA signals from the plurality of active ports in a MoCA signal communication path which bypasses the CATV active downstream and upstream communication paths through the CATV entry adapter to the passive port, and connecting MoCA interface devices to the passive port and at least one of the active ports. The method may also include preventing the conduction of MoCA signals from within the CATV entry device onto the entry port and the CATV network.

By bypassing MoCA signals around the CATV active downstream signal communication paths and the CATV active upstream signal communication paths, passive port is also available to be used as part of the MoCA network, provided that passive subscriber equipment is not connected to the passive port. Use of the passive port is possible because the MoCA signals are not attenuated as would occur if the MoCA signals were passed through either of the CATV signal communication paths. By preventing the MoCA signals from passing from the CATV entry adapter to the CATV network, the privacy and security of the information communicated with in one MoCA network is not compromised by inadvertent transfer to another MoCA network in an adjacent subscriber premises. Confining all of the components and functionality within a housing of the CATV entry adapter greatly facilitates its use.

Other and different statements and aspects of the invention appear in the following claims. A more complete appreciation of the present invention, as well as the manner in which the present invention achieves the above and other improvements, can be obtained by reference to the following detailed description of a presently preferred embodiment taken in connection with the accompanying drawings, which are briefly summarized below, and by reference to the appended claims.

DETAILED DESCRIPTION

Figure 1:
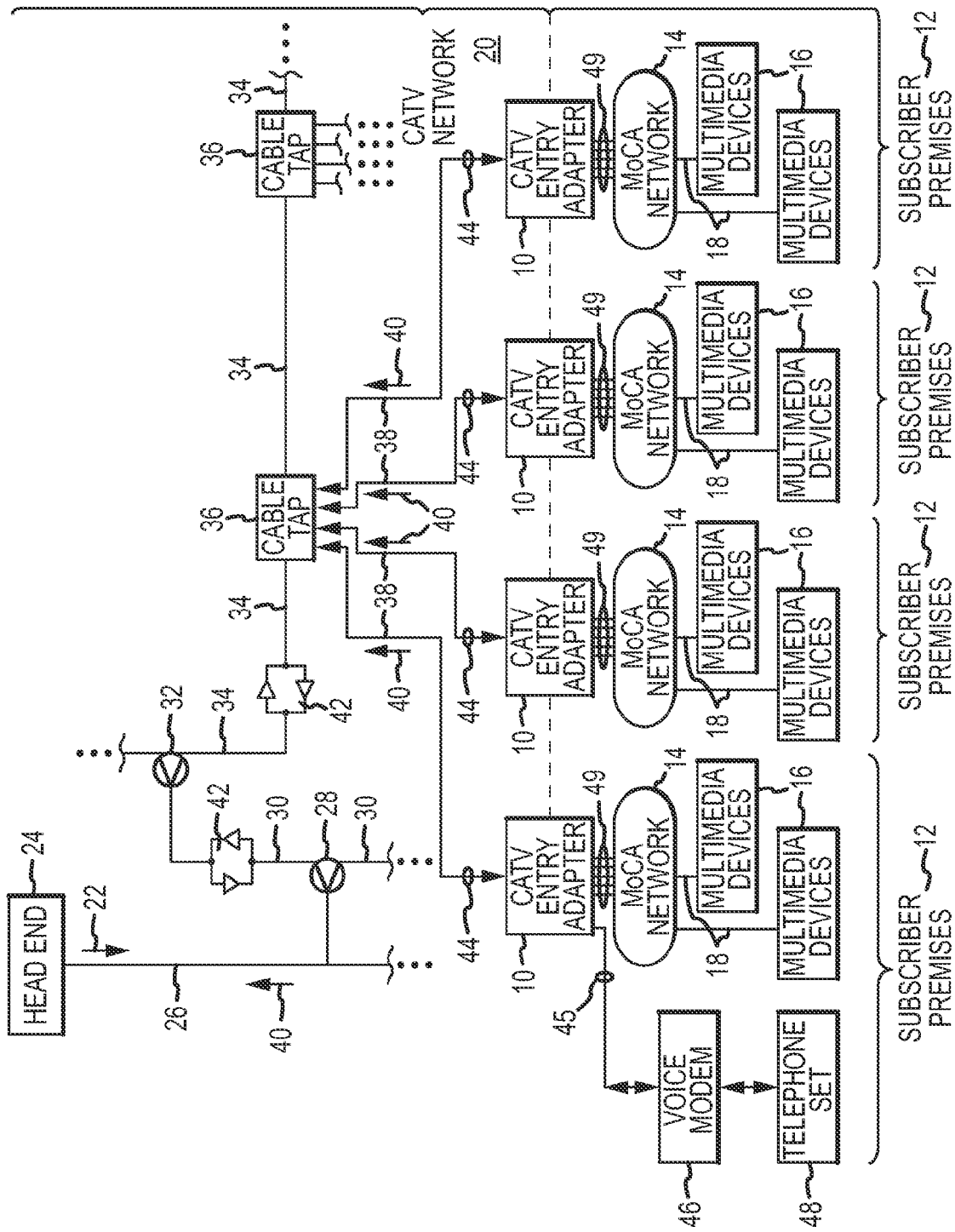
FIG. 1 is a block diagram illustrating a plurality of CATV entry adapters which incorporate the present invention, shown interconnecting a CATV network and a plurality of MoCA in-home networks each located at subscriber premises.

A CATV entry adapter 10 which incorporates the present invention is shown generally in FIG. 1. The CATV entry adapter 10 is located at subscriber premises 12 and forms a part of a conventional MoCA in-home entertainment network 14. Multimedia devices 16 are connected to the MoCA network 14 in the subscriber premises 12. The multimedia devices 16 communicate multimedia content or MoCA signals between one another using the MoCA network 14 which is formed in part by the preexisting coaxial cable infrastructure (represented generally by coaxial cables 18) present in the subscriber premises 12. Examples of multimedia devices 16 are digital video recorders, computers, data modems, computer game playing devices, television sets, television set-top boxes, and other audio and visual entertainment devices.

The CATV entry adapter 10 is also a part of a conventional CATV network 20. The CATV entry adapter delivers CATV content or signals from the CATV network to subscriber equipment at the subscriber premises 12. The subscriber equipment includes the multimedia devices 16, but may also include other devices which do not operate as a part of the MoCA network 14 but which are intended to function as a result of connection to the CATV network 20. Examples of subscriber equipment which are normally not part of the MoCA network 14 are voice modems and connected telephone sets.

The CATV entry adapter 10 has beneficial characteristics which allow it to function in multiple roles simultaneously in both the MoCA network 14 and in the CATV network 20, thereby benefiting both the MoCA network 14 and the CATV network 20. The CATV entry adapter 10 functions as a hub in the MoCA network 14, to effectively transfer MoCA signals between the multimedia devices 16, including those that might be connected to passive ports of the CATV entry adapter 10, as will be described in greater detail below. The CATV entry adapter 10 also functions in a conventional role as an interface between the CATV network 20 and the subscriber equipment located at the subscriber premises, thereby facilitating CATV service to the subscriber. In addition, the CATV entry adapter 10 securely and privately confines MoCA network communications within each subscriber premise and to prevent the MoCA signals from entering the CATV network 20 and degrading the strength of the CATV signals conducted by the CATV network. These and other improvements and functions are described in greater detail below.

The CATV network 20 shown in FIG. 1 has having a typical topology. Downstream signals 22 originate from programming sources at a headend 24 of the CATV network 20, and are conducted to the CATV entry adapter 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 are delivered from the CATV entry adapter 10 to the CATV network 20, and are conducted to the headend 24 in a reverse sequential path. Interspersed at appropriate locations within the topology of the CATV network 20 are conventional repeater amplifiers 42, which amplify both the downstream signals 22 and the upstream signals 40. Conventional repeater amplifiers may also be included in the cable taps 36. The cable taps 36 and signal splitter/combiners 28 and 32 divide a single downstream signal into multiple separate downstream signals, and combine multiple upstream signals into a single upstream signal.

The CATV entry adapter 10 receives the downstream signals 22 from the CATV network 20 at a CATV network entry or connection port 44. The downstream signals 22 are either passive or active. Passive downstream signals are those signals which are conducted through the CATV entry adapter 10 without amplification, enhancement, modification or other substantial conditioning. The passive downstream signals are delivered from a passive port 45 to passive subscriber equipment, such as a voice modem 46 connected to a telephone set 48 (shown connected to only one CATV entry adapter 10 in FIG. 1). Active downstream signals are those signals which are amplified, filtered, modified, enhanced or otherwise conditioned by power-consuming active electronic circuit components within the CATV entry adapter 10, such as an amplifier for example. The conditioned active downstream signals are divided into multiple copies and delivered from a plurality of active ports (collectively referenced at 49 in FIG. 1, but individually referenced at 50, 52, 54 and 56 in FIG. 2) to subscriber equipment located at the subscriber premises 12.

The CATV subscriber equipment typically generates upstream signals 40 (FIG. 2) and delivers them to the CATV entry adapter 10 for delivery to the CATV network 20. The upstream signals 40 may be passive upstream signals generated by passive subscriber equipment, exemplified by the voice modem 46 and the telephone set 48, or the upstream signals 40 may be active upstream signals generated by active subscriber equipment exemplified by set-top boxes connected to television sets (neither shown). Set top boxes allow the subscriber/viewer to make programming and viewing selections.

Figure 2:
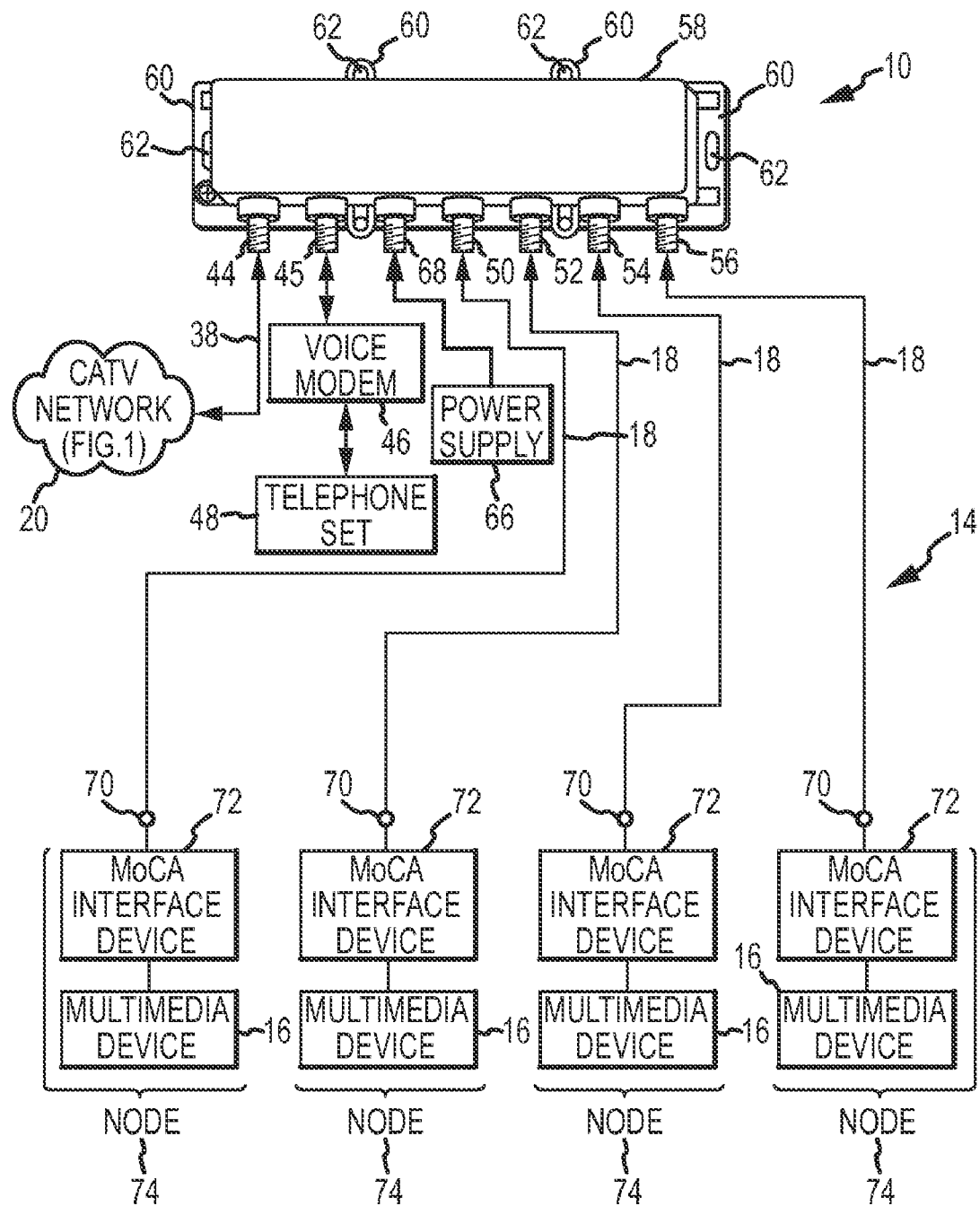
FIG. 2 is a generalized perspective view of one CATV entry adapter shown in FIG. 1, connected to the MoCA network in one subscriber premises, with more details of the MoCA network and active and passive subscriber equipment connected to the CATV entry adapter shown in block diagram form.

More details concerning the CATV entry device are shown in FIG. 2. The CATV entry adapter 10 includes a housing 58 which encloses internal electronic circuit components (shown in FIGS. 3 and 4). A mounting flange 60 surrounds the housing 58 and holes 62 in the flange 60 allow attachment of the CATV entry adapter 10 to a support structure at a subscriber premises 12. Electrical power for the CATV entry adapter 10 is supplied from a conventional DC power supply 66 connected to a dedicated power input port 68. Alternatively, electrical power can be supplied through a conventional power inserter (not shown) that is connected to one of the active ports 50, 52, 54 or 56. The power inserter allows relatively low voltage DC power to be conducted through the same active port that also conducts high-frequency signals. Use of a conventional power inserter eliminates the need for a separate dedicated power supply port 68, or provides an alternative port through which electrical power can also be applied. The power supply 66 or the power supplied from the power inserter is typically derived from a conventional wall outlet (not shown) within the subscriber premises 12. The CATV network 20 is connected to the CATV network entry port 44 of the CATV entry adapter 10.

The ports 44, 45, 50, 52, 54, 56 and 68 are each preferably formed by a conventional female coaxial cable connector which is mechanically connected to the housing 58 and which is electrically connected to internal components of the CATV entry adapter 10. Coaxial cables 18 from the subscriber premises cable infrastructure and the drop cables 38 (FIG. 1) are connected to the CATV entry adapter 10 by mechanically connecting the corresponding mating male coaxial cable connector (not shown) on these coaxial cables to the female coaxial cable connectors forming the ports 44, 45, 50, 52, 54, 56 and 68.

One CATV entry adapter 10 is located at each subscriber premises. The number of active and passive ports 45, 50, 52, 54 and 56 is dictated by the number of coaxial cables 18 which are routed throughout the subscriber premises.

Although the CATV entry adapter 10 shown in FIG. 2 includes seven ports, other entry adapters have a larger number of ports. The number and routing of the coaxial cables 18 within the subscriber premises constitute the in-home or subscriber premise cable infrastructure that each used by the MoCA network 14 (FIG. 1).

Since the CATV service provider supplies the CATV entry adapter 10 for use by each subscriber, it is advantageous to reduce the number of different configurations of CATV entry adapters. Doing so offers economies of scale in mass production, reduces the opportunity for errors in installation, allows the subscriber to expand and change the in-home cable infrastructure, and reduces inventory costs, among other things. The CATV entry adapter 10 also has the capability of functioning as a hub in the MoCA network 14 (FIG. 1). With built-in hub capability as described below, and with the capability to use all of the available ports for connection to multimedia devices 16, the CATV entry adapter 10 is more useful and economical to both the CATV service provider and the subscriber who wishes to implement a MoCA in-home entertainment network at his or her premises.

Each of the coaxial cables 18 of the in-home cable infrastructure terminates at a cable outlet 70. Those coaxial cables 18 which are not currently in use are terminated with an appropriate termination resistor (not shown) located at the cable outlet 70 of these coaxial cable 18. In most cases however, the cable outlet 70 of these coaxial cable 72 is connected to a MoCA interface device 72 where a multimedia device 16 is connected.

Each MoCA interface device 72 is a conventional item presently available for purchase and use. Each MoCA interface device 72 contains a controller which is programmed with the necessary functionality to implement the MoCA communication protocol. Each MoCA interface device 72 is connected between the cable outlet 70 and a multimedia device 16. When the multimedia device 16 creates output signals, those output signals are encapsulated or otherwise embodied in MoCA signals created by the MoCA interface device 72, and then those MoCA signals are communicated by one MoCA interface device 72 through the coaxial cables 18 of the in-home cable infrastructure, through the CATV entry adapter 10, and to another MoCA interface device 72. The other MoCA interface device 72 extracts the original output signals that were encapsulated or otherwise embodied in the MoCA signals and supplies those original output signals to the multimedia device 16 to which the MoCA interface device 72 is attached. In this manner, MoCA signals or multimedia content from one multimedia device 16 are/is communicated through the MoCA network 14 (FIG. 1) to another multimedia device 16 for use at its location. Functioning in this manner, and in terms of the conventional terminology used in the field of networks, the MoCA interface device 72 and the multimedia device 16 form one node 74 of the MoCA network 14. MoCA signals are therefore communicated between the different MoCA nodes 74 of the MoCA network 14.

Figure 3:
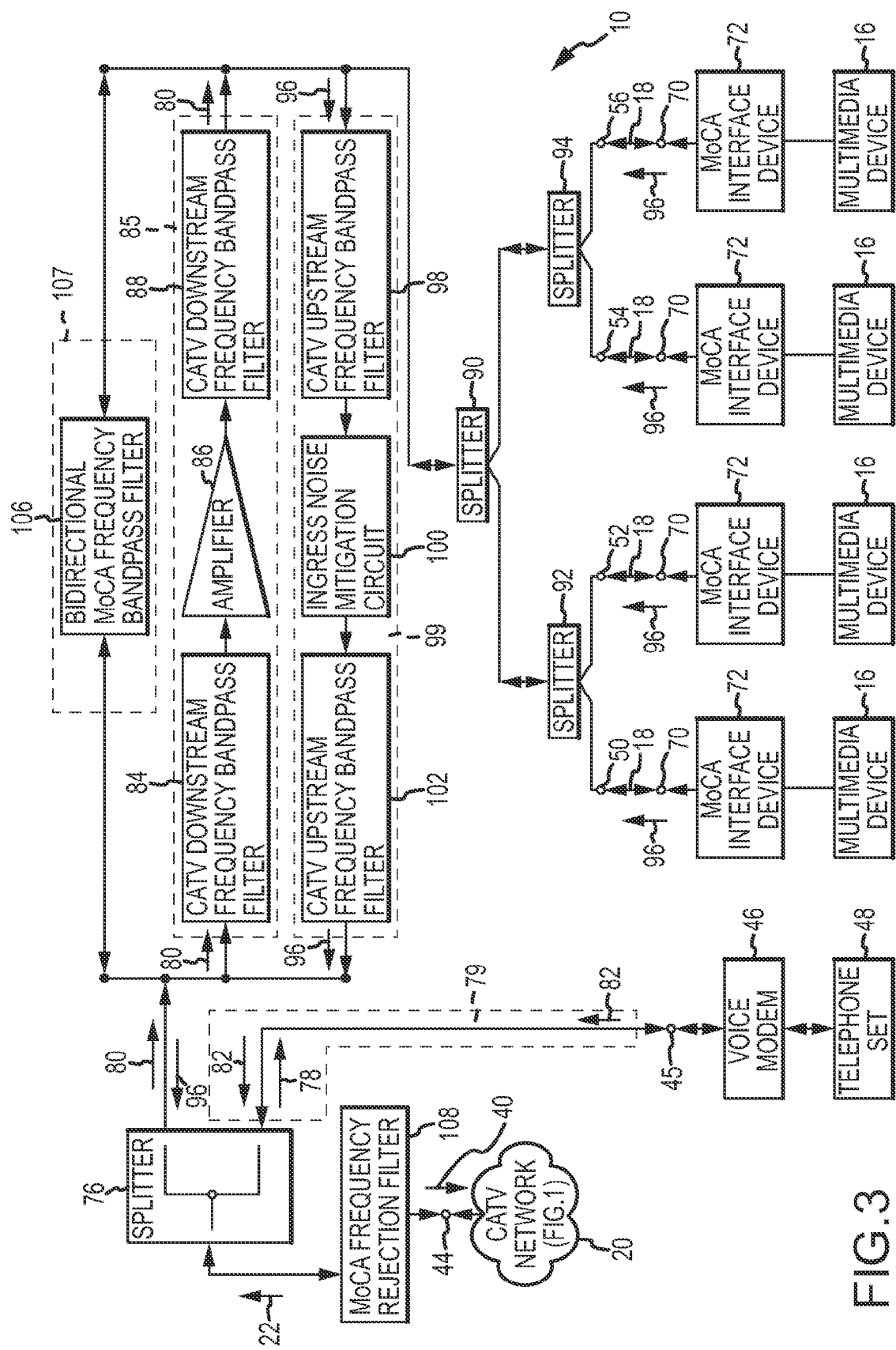
FIG. 3 is a block diagram of functional components of the CATV entry adapter shown in FIG. 2, shown connected to the CATV network, and also showing components forming nodes of the MoCA network.

The internal functional components of the CATV entry adapter 10 are shown in FIG. 3. Those internal circuit components include a conventional bidirectional signal splitter/combiner 76 which separates the downstream signals 22 from the CATV network 20 at the entry port 44 into passive CATV downstream signals 78 and active CATV downstream signals 80. The passive downstream signals 78 are conducted directly to and through the passive port 45 to the passive subscriber equipment 46 and 48. Passive upstream signals 82 are created by the passive subscriber equipment 46 and 48 and are conducted through the passive port 45 directly through a CATV passive signal communication path 79 to the signal splitter/combiner 76 to become upstream signals 40 in the CATV network 20. The direct CATV passive signal communication path 79 for the passive signals in the CATV entry adapter 10 contains no active electronic components that might fail or malfunction, thereby enhancing the reliability of CATV passive communications. The CATV passive communication path 79 is intended to be as reliable as possible since it may be used in emergency and critical circumstances.

The active CATV downstream signals 80 are conducted to a first CATV downstream frequency bandpass filter 84 in a CATV active downstream signal communication path 85. The downstream filter 84 passes signals having frequencies in the CATV downstream frequency range of 54-1002 MHz, and rejects signals having frequencies in other ranges. The downstream signals passed by the filter 84 are amplified by an amplifier 86 and then supplied to a second CATV downstream frequency bandpass filter 88, both of which are also part of the CATV active downstream signal communication path 85.

The amplified and further filtered CATV downstream signals are then conducted to a first bidirectional splitter/combiner 90, which splits or divides those signals into two identical CATV downstream signals. The two signals from the first splitter/combiner 90 are supplied as inputs to two other bidirectional splitters/combiners 92 and 94, respectively, which are connected in cascade with the first splitter/combiner 90. The splitters/combiners 92 and 94 again split or divide each of their two input signals into two identical CATV downstream signals. The four output signals from the cascade-connected splitters/combiners 90, 92 and 94 are applied at the active ports 50, 52, 54 and 56 of the CATV entry adapter 10. Although for active ports 50, 52, 54 and 56 are shown, more active ports are achieved by use of more splitters/combiners connected in cascade. To the extent that the multimedia devices 16 connected through the coaxial cables 18 directly respond to the CATV downstream signals, each MoCA interface device 72 passes those downstream signals directly to the multimedia device 16. The MoCA interface device 72 does not modify or otherwise influence the CATV downstream signals passing through it.

In those cases where the multimedia device 16 is capable of sending CATV upstream signals 96, those signals 96 are likewise passed through the MoCA interface device 72 without change or influence and are then conducted through the cable outlet 70, the coaxial cable 18 and the active ports 50, 52, 54 or 56 to the splitters/combiners 92 and 94. The splitters/combiners 92 and 94 combine all CATV upstream signals 96 and supply those upstream signals to the splitter 90. The splitter 90 combines the CATV upstream signals 96 from the splitters 92 and 94 and supplies them to a first CATV upstream frequency bandpass filter 98, which forms a part of a CATV active upstream signal communication path 99. The filter 98 passes signals having frequencies in the CATV upstream frequency range of 5-42 MHz, and rejects signals having frequencies in other ranges. The CATV upstream signals passed by the filter 84 are then preferably supplied to a ingress noise mitigation circuit 100. The ingress noise mitigation circuit 100 suppresses ingress noise in the range of 0-5 MHz that may have originated from noise sources within the subscriber premises. The ingress noise mitigation circuit 100 is optional in the CATV entry adapter 10, but if employed, is preferably employed in the form described in the co-pending U.S. patent application described above. The CATV upstream signals leaving the circuit 100 are then applied to a second CATV upstream frequency bandpass filter 102. The ingress noise mitigation circuit 100 and the second CATV upstream bandpass filter 102 are part of the CATV active upstream signal communication path 99. The filtered active upstream signals leaving the second filter 102 are supplied to the splitter/combiner 76, and are conducted through the CATV entry port 44 to the CATV network 20.

When the CATV entry adapter 10 is used as a hub in the MoCA network 14 (FIG. 1), and passive subscriber equipment 46 and 48 is connected to the only passive port 45 of that entry adapter 10, the MoCA network 14 exists only between and through the active ports 50, 52, 54 and 56, as is shown in FIG. 3. MoCA signals from the MoCA interface devices 72 are communicated through the cable outlets 70, the coaxial cables 18, the active ports 50, 52, 54 and 56, and the splitters/combiners 92, 94 and 90. The MoCA signals traverse or jump between the outputs of the splitters/combiners. In this case, the splitters/combiners 90, 92 and 94 connect all of the coaxial cables 18 at a common location so that all the MoCA signals may be conducted between all of the MoCA interface devices 72.

Figure 4:
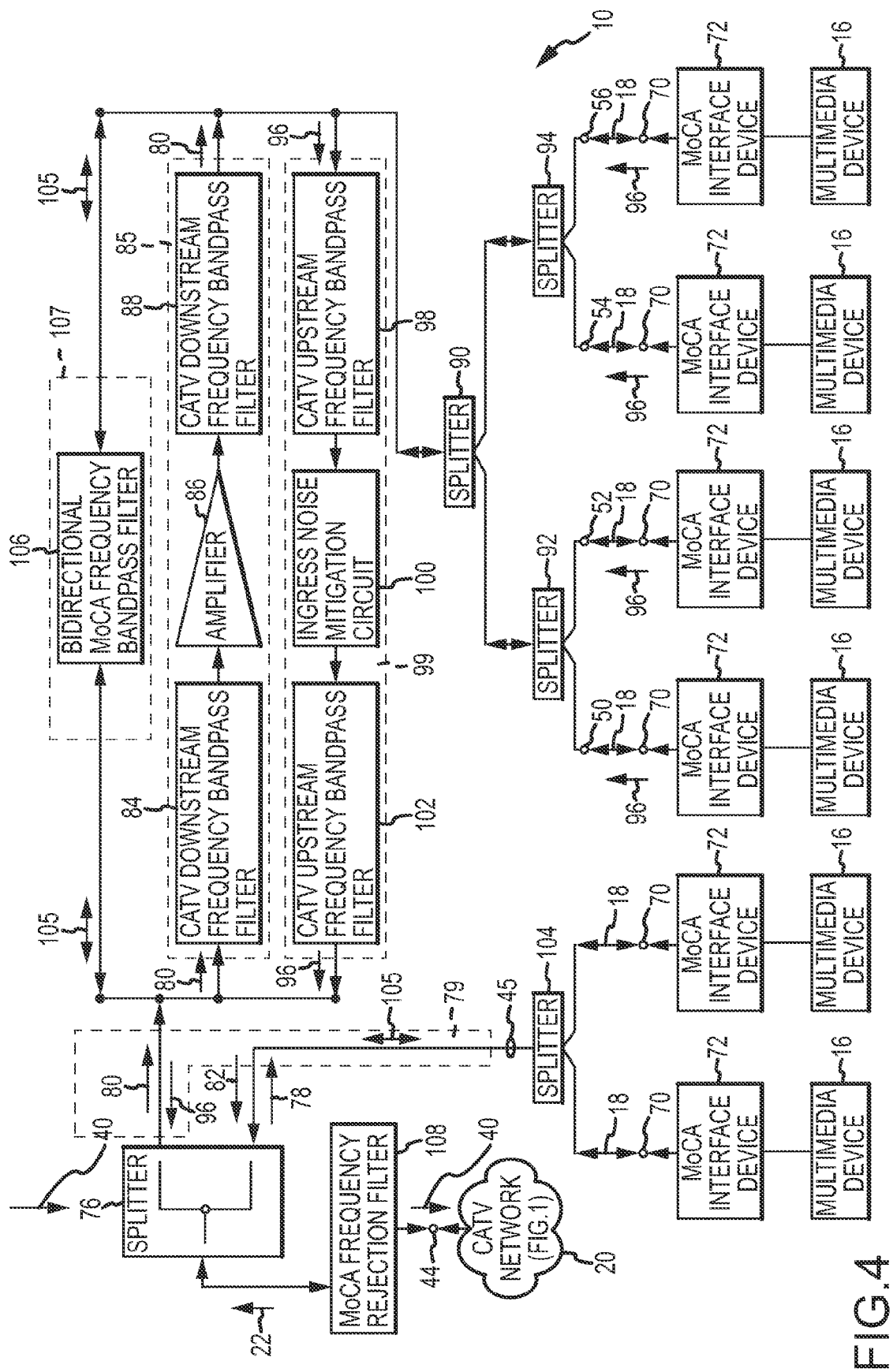
FIG. 4 is a block diagram similar to FIG. 3, illustrating the connection of additional MoCA nodes of the MoCA network to a passive port of the CATV entry adapter.

Whenever there is no life-line voice service connected to the passive port 45 of the CATV entry adapter 10, the passive port 45 becomes available for use as part of the MoCA network 14, as is shown in FIG. 4. In a situation shown in FIG. 4, a splitter/combiner 104 has been connected externally of the passive port 45 of the CATV entry adapter 10. Consequently, the splitter/combiner 104 is not built-in or incorporated within the CATV entry adapter 10, but instead, the splitter/combiner is part of the in-home cable infrastructure. Coaxial cables 18 connect to the splitter/combiner 104 and the cable outlets 70 of those coaxial cables connect to MoCA interface devices 72 which are connected to multimedia devices 16 in the manner previously described.

MoCA signals between the two MoCA interface devices 72 connected to the splitter 104 communicate with each other by traversing or jumping the splitter/combiner 104. The MoCA signals generated by the two MoCA interface devices 72 are also be conducted to the splitter combiner 76 where those signals will jump or traverse it. However, there is no direct communication path from the splitter/combiner 76 through either the CATV active downstream signal communication path 85 through components 84, 86 and 88 or through the CATV active upstream signal communication path 99 through components 98, 100 and 102. The components within the CATV upstream and downstream communication paths 85 and 99 severely attenuate the MoCA signals in the D channel frequency range, because the D channel signals are in the 1125-1525 MHz frequency range. The filters 84 and 86 in the CATV downstream communication path 85 and the filters 98 and 102 in the CATV upstream communication path 99 reject the D channel MoCA signals. Moreover, attempting to conduct the MoCA signals in the reverse direction through the amplifier 86 results in severe attenuation of those signals, if such conduction is even possible. A similar result applies when attempting to conduct MoCA signals through the ingress noise mitigation circuit 100.

Figure 5:
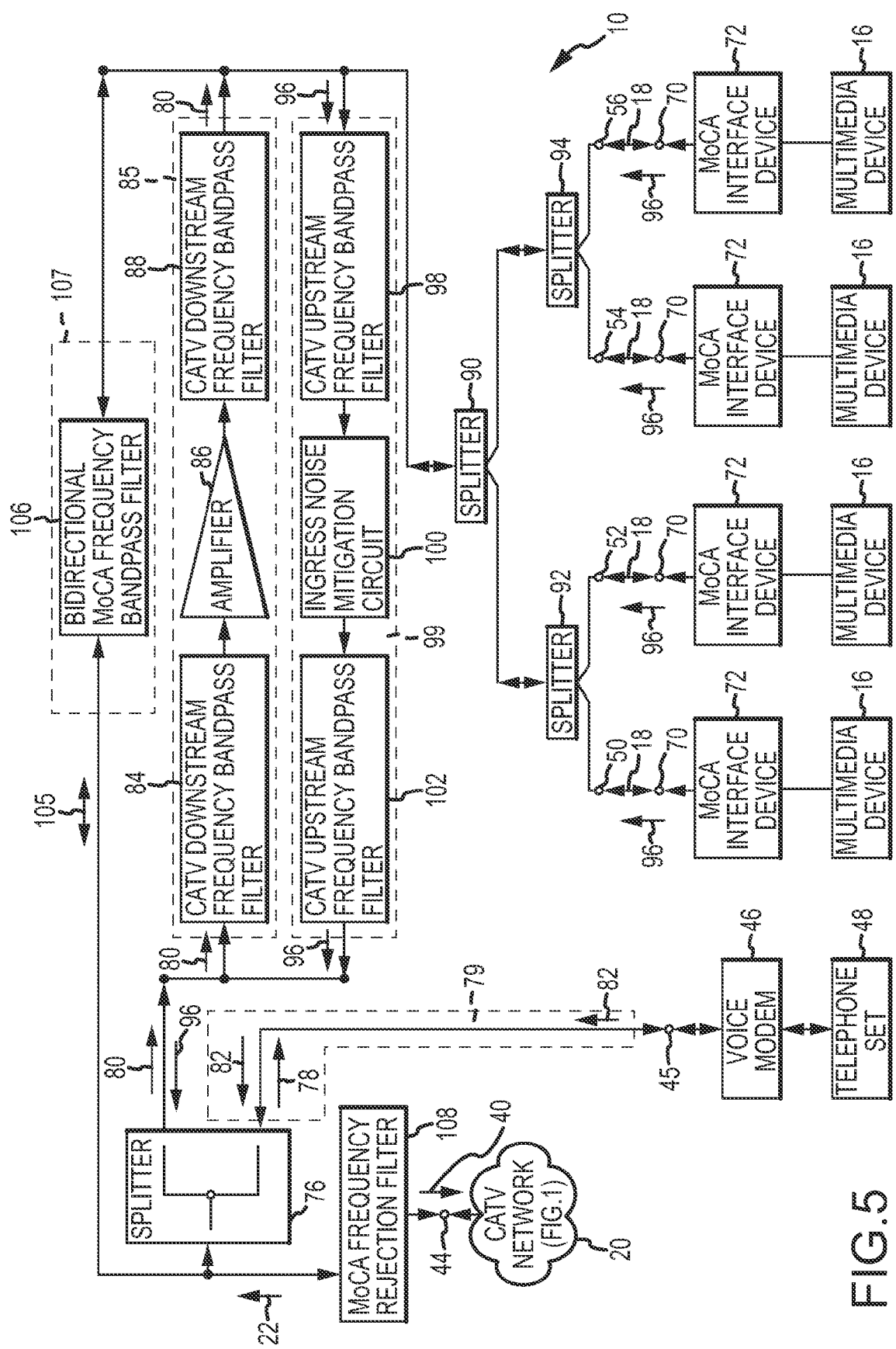
FIG. 5 is a block diagram similar to FIG. 3, illustrating a different connection of a MoCA signal communications path than that shown in FIG. 3.

To permit the CATV entry device 10 to communicate MoCA signals 105 from the passive port 45 to the active ports 50, 52, 54 and 56, a bidirectional MoCA frequency bandpass filter 106 is connected directly between the splitters/combiner 76 and 78, in parallel with the CATV upstream and downstream paths. The bidirectional MoCA frequency bandpass filter 106 forms a MoCA signal communication path 107. The MoCA frequency bandpass filter 106 passes the D channel MoCA signals in the 1125-1525 MHz frequency range without significant attenuation. Consequently, MoCA signals 105 freely through the filter 106 without substantial attenuation where the MoCA signals 105 jump or traverse the splitter/combiner 76 in substantially the same way that MoCA signals jump or traverse the splitters 90, 92, 94 and 104. In this manner, all of the multimedia devices 16 may communicate with each other through the CATV entry adapter 10 without significant attenuation created by the active circuit components in the CATV upstream and downstream signal communication paths 85 and 99. However, including the bidirectional MoCA frequency bandpass filter 106 in the CATV entry adapter 10 has no adverse influence over its functionality in distributing CATV signals, because the MoCA frequency bandpass filter 106 rejects the CATV active downstream and upstream signals conducted through the CATV active signal communication paths 85 and 99. The bidirectional MoCA frequency bandpass filter 106 can also be connected to the input side of the splitter combiner 76, as shown in FIG. 5.

Another significant advantage of the CATV entry adapter 10 is that it includes a MoCA frequency rejection filter 108 connected between the splitter/combiner 76 and the CATV network entry port 44. The MoCA frequency rejection filter 108 prevents signals in the MoCA frequency band from passing from the splitter/combiner 76 into the CATV network, but allows the CATV active downstream and upstream signals to pass without impairment. The MoCA rejection filter 108 absorbs the energy of any MoCA signals, thereby preventing the MoCA signals from reaching the CATV network 20. Eliminating the MoCA signals by use of the MoCA rejection filter 108 prevents the MoCA signals from the MoCA network 14 (FIG. 1) from being received and comprehended at an adjacent subscriber premises. Without the MoCA rejection filter 108 and is understood from FIG. 1, the MoCA signals from one CATV entry adapter 10 could traverse the drop cables 38 to the cable tap 36, and from the cable tap through another drop cable 38 of that cable tap 36 to an adjacent CATV entry adapter 10. The MoCA rejection filter 108 prevents this from happening. In addition to protecting the security and privacy of the MoCA signals within the MoCA network 14 in each subscriber premises, the MoCA rejection filter 108 also prevents the MoCA signals from an adjacent subscriber premise from adversely influencing or deteriorating the quality of the MoCA signals in an adjacent MoCA network connected to a cable tap 36 (FIG. 1).

As described above, the CATV entry adapter 10 of the present invention beneficially contributes to establishing a MoCA in-home entertainment network. All of the active and passive ports of the CATV entry adapter are usable in the MoCA network. The CATV entry adapter is therefore fully functional as a MoCA network hub to communicate all MoCA signals between all MoCA interface devices without substantially attenuating the strength of the MoCA signals in such a way that the MoCA interface devices are unable to compensate in the manner intended by the MoCA communication protocol. The CATV entry adapter prevents or greatly inhibits MoCA signals from reaching the CATV network. Doing so does not compromise the privacy and security of the MoCA content which is expected to be maintained only within the MoCA network of the subscriber premises. By confining the MoCA signals to the MoCA network at the subscriber premises, MoCA signals are not available over the CATV network to interfere with other MoCA networks established at other subscriber premises. The advantageous functionality of the CATV entry adapter in regard to MoCA network communications is protected within the housing of the CATV entry adapter, to shield it from unauthorized removal, tampering, forgetfulness in original installation, and physical exposure. The CATV entry adapter does not inhibit or otherwise adversely influence normal CATV signal distribution functionality. The multi-functional aspects of the CATV entry adapter allow it to be used in a wide variety of situations, thereby increasing its economies of scale and facilitating greater convenience in installation by the CATV service provider. In addition, use of the CATV entry adapter allows subscribers more flexibility in expanding and changing both their CATV subscriber equipment and their MoCA network and multimedia devices.

The significance of these and other improvements and advantages will become apparent upon gaining a full appreciation of the present invention. A preferred embodiment of the invention and many of its improvements have been described above with a degree of particularity. The detailed description is of a preferred example of implementing the invention. The detail of the description is not necessarily intended to limit the scope of the invention. The scope of the invention is defined by the following claims.

The invention claimed is:

1. A cable television (CATV) entry adapter for interfacing a CATV network with subscriber equipment at subscriber premises and for connecting multimedia devices at the subscriber premises in a Multimedia over Coax Alliance (MoCA) network, the MoCA network including MoCA interface devices connected to multimedia devices by which to communicate MoCA signals in a MoCA frequency band between the MoCA interfaces over the MoCA network, at least one of the multimedia devices also constituting subscriber equipment, the CATV entry adapter comprising:

a housing;

a CATV entry port connected to the housing and operative to connect the CATV entry adapter to the CATV network;

a passive port connected to the housing and operative to connect to passive subscriber equipment;

a plurality of active ports connected to the housing, each active port operative to connect to active subscriber equipment and to MoCA interface devices;

a CATV active downstream signal communication path connected between the CATV entry port and the plurality of active ports, the CATV active downstream signal communication path communicating CATV downstream signals from the CATV network to the active subscriber equipment connected to the active ports, the CATV active downstream signal communication path including at least one active electronic component for conditioning the CATV downstream signals before communication to the active ports, the CATV active downstream signal communication path passing CATV downstream signals in a CATV downstream frequency band and rejecting all signals of other frequencies;

a CATV active upstream signal communication path connected between the plurality of active ports and the CATV entry port, the CATV active upstream signal communication path communicating CATV active upstream signals from the subscriber equipment connected to the active port to the CATV network, the CATV active upstream signal communication path passing CATV active upstream signals in a CATV upstream frequency band and rejecting all signals of other frequencies;

a CATV passive signal communication path connected between the CATV entry port and the passive port, the CATV passive signal communication path communicating CATV passive downstream signal and CATV passive upstream signal between the CATV network and passive subscriber equipment connected to the passive port, the CATV passive signal communication path including no active components for conditioning the CATV passive downstream signal and the CATV passive upstream signal communicated through the CATV passive signal communication path;

a signal bidirectional splitter/combiner formed internal to the housing and connected between the CATV entry port and to the CATV active downstream signal communication path, the CATV active upstream signal communication path and the CATV passive signal communication path, the signal bidirectional splitter/combiner operatively creating two downstream signals from each downstream signal supplied by the CATV network and supplying one of the two created downstream signals to the CATV active downstream signal communication path and supplying the other one of the two created downstream signals to the CATV passive signal communication path, the signal bidirectional splitter/combiner operatively creating a single upstream signal from the CATV active upstream signal and the CATV passive upstream signal supplied respectively by the CATV active upstream signal communication path and the CATV passive signal communication path and supplying the single created upstream signal to the CATV network;

a MoCA signal frequency rejection filter formed internal to the housing and directly connected between the signal bidirectional splitter/combiner and the CATV entry port, the MoCA signal frequency rejection filter operatively preventing conduction of MoCA signals in the MoCA frequency band from passing from the signal bidirectional splitter/combiner onto the CATV network, but allowing the CATV active upstream signal, the CATV passive downstream signal and the CATV passive upstream signal to pass without impairment, wherein the housing also contains the MoCA frequency rejection filter; and a MoCA signal communication path connected to the signal bidirectional splitter/combiner and the active ports for conducting MoCA signals in the MoCA frequency band between the active ports and the signal bidirectional splitter/combiner while bypassing MoCA signals conducted around the CATV active downstream and the CATV active upstream signal communication paths, the MoCA signal communication path passing MoCA signals in the MoCA frequency band and rejecting all signals of other frequencies, wherein the MoCA signals bypassed by the MoCA signal communication path avoiding attenuation which would otherwise result from communicating the MoCA signals through the CATV active downstream and the CATV active upstream signal communication paths; the MoCA signals traverse the signal bidirectional splitter/combiner between the MoCA signal communication path and the CATV passive signal communication path to enable conduction the MoCA signals from the MoCA signal communication path to the CATV passive signal communication path and any MoCA interface devices connected to the passive port; and the housing internally contains the CATV active downstream signal communication path, the CATV active upstream signal communication path, the MoCA signal communication path, and the CATV passive signal communication path.

2. A CATV entry adapter as defined in claim 1, further comprising: a second bidirectional signal splitter/combiner in addition to the bidirectional signal splitter/combiner first aforesaid which is connected to the CATVentry port, the second signal splitter combiner connected between a plurality of active ports and the CATV active downstream and the CATV active upstream signal communication paths and the MoCA signal communication path, the second signal splitter/combiner creating two downstream signals from each CATV downstream signal supplied by the CATV active downstream signal communication path and from each MoCA signal supplied by the MoCA signal communication path, the second signal splitter/combiner supplying one of the two created downstream signals to one of the active ports and supplying the other one of the two created downstream signals to the other one of the active ports, the second signal splitter/combiner also creating a single upstream signal from the CATV active upstream signals and the MoCA signals supplied at the plurality of active ports, and the second signal splitter/combiner also supplying the single upstream signal created to the CATV active upstream signal communication path and to the MoCA signal communication path; and wherein: the housing also contains the second signal splitter/combiner.

3. A CATV entry adapter as defined in claim 2, further comprising:
a plurality of ones of the second bidirectional splitter/combiner connected in cascade with one another between the plurality of active ports and the CATV active downstream and the CATV active upstream signal communication paths and the MoCA signal communication path.

4. A CATV entry adapter as defined in claim 1, wherein: the MoCA signal communication path comprises a bidirectional MoCA frequency bandpass filter operative to conduct MoCA signals.

5. A CATV entry adapter as defined in claim 4, wherein: one active electronic component of the CATV active downstream signal communication path comprises a signal amplifier.

6. A CATV entry adapter as defined in claim 4, wherein:
the CATV active upstream signal communication path comprises an ingress noise mitigation circuit operative to suppress upstream ingress noise in a frequency range of 0-42 MHz originating from subscriber equipment connected to the active ports.

7. A CATV entry adapter as defined in claim 1, further comprising, in combination:
an external signal bidirectional splitter/combiner located on the exterior of the housing and connected to the passive port; and
a plurality of multimedia devices connected to the external signal bidirectional splitter/combiner.

8. A cable television (CATV) entry adapter having an entry port and a passive port and a plurality of active ports by which to interface a CATV network connected at the entry port with subscriber equipment at subscriber premises connected at the active ports while functioning as a hub in a Multimedia over Coax Alliance (MoCA) network which communicates MoCA signals in a MoCA frequency band between MoCA interface devices connected to the active and passive ports, comprising:
a housing;
a CATV passive signal communication path which conducts CATV passive downstream and CATV passive upstream signals between the passive port and the entry port;
a CATV active downstream communication path which conducts CATV active downstream signals between the entry port and the active ports;
a CATV active upstream communication path which conducts CATV active upstream signals between the active ports and the entry port;
a signal bidirectional splitter/combiner formed internal to the housing and connected between a CATV entry port and to the CATV active downstream communication path, the CATV active upstream communication path and the CATV passive signal communication path, the signal bidirectional splitter/combiner operatively creating two downstream signals from each downstream signal supplied by the CATV network and supplying one of the two created downstream signals to the CATV active downstream communication path and supplying the other one of the two created downstream signals to the CATV passive signal communication path, the signal bidirectional splitter/combiner operatively creating a single upstream signal from the CATV active upstream signal and the CATV passive upstream signal supplied respectively by the CATV active upstream communication path and the CATV passive signal communication path and supplying the single created upstream signal to the CATV network; and
a MoCA signal frequency rejection filter formed internal to the housing and directly connected between the signal bidirectional splitter/combiner and the CATV entry port, the MoCA signal frequency rejection filter operatively preventing conduction of MoCA signals in the MoCA frequency band from passing from the signal bidirectional splitter/combiner onto the CATV network, but allowing the CATV active upstream signal, the CATV passive downstream signal and the CATV passive upstream signal to pass without impairment, wherein the housing also contains the MoCA frequency rejection filter, wherein the MoCA signal frequency resection filter conducts the MoCA signals in the MoCA frequency band around the CATV active downstream and the CATV active upstream communication paths when communicating the MoCA signals from MoCA interface devices at the active ports to each MoCA device connected to a passive port.

9. A CATV entry adapter as defined in claim 8, wherein the MoCA signal frequency rejection filter is connected at the entry port to suppress the conduction of MoCA signals onto the CATV network.

10. A CATV entry adapter as defined in claim 9, wherein the housing comprises a portion to which the entry port and the passive port and the active ports are connected at an exterior of the housing, and within which the CATV passive signal communication path, the CATV active downstream communication path, the CATV active upstream communication path, the MoCA signal communication path and the MoCA signal rejection filter are confined.

11. A CATV entry adapter as defined in claim 10, further comprising:
a plurality of second bidirectional signal splitters/combiners connected in cascade with one another and between the plurality of active ports and the CATV active downstream and the CATV active upstream signal communication paths and the MoCA signal communication path; and
wherein:
the first and second bidirectional signal splitters/combiners are also confined within the housing.

12. A CATV entry adapter as defined in claim 10, further comprising:
a second bidirectional signal splitter/combiner having a first port, a second port and a third port;
the first port connected to the MoCA signal rejection filter and to the MoCA signal communication path;

the second port connected to coupled with both the CATV active downstream and the CATV active upstream signal communication paths;

the third port connected to the passive signal communication path; and a plurality of second bidirectional signal splitters/combiners connected in cascade with one another and between the plurality of active ports and the CATV active downstream and the CATV active upstream signal communication paths and the MoCA signal communication path; and wherein:

the first and second bidirectional signal splitters/combiners are also confined within the housing.

13. A method of using a cable television (CATV) entry adapter having a plurality of ports to interface CATV upstream signals and CATV downstream signals supplied from a CATV network with subscriber equipment at subscriber premises while simultaneously functioning as a hub in a Multimedia over Coax Alliance (MoCA) network which communicates MoCA signals in a MoCA frequency band between MoCA interface devices connected to multimedia devices at least some of which include the subscriber equipment, the method comprising:

conducting CATV signals to and from the CATV entry adapter at an entry one of the ports;

conducting CATV passive signals from the CATV network in a CATV passive signal communication path through the CATV entry adapter to a passive one of the ports;

conducting CATV downstream signals from the CATV network in a CATV active downstream signal communication path through the CATV entry adapter to a plurality of active ones of the ports;

conducting CATV active upstream signals from the plurality of active ports in a CATV active upstream communication path through the CATV entry adapter to the entry port;

conducting the MoCA signals in the MoCA frequency band from the plurality of active ports in a MoCA signal communication path which bypasses the CATV active downstream and the CATV active upstream communication paths through the CATV entry adapter to the passive port;

connecting MoCA interface devices to the passive port and at least one of the active ports;

splitting, by a first bidirectional signal splitter/combiner formed internal to the housing, each downstream signal supplied by the CATV network into two downstream signals supplied by the CATV network;

supplying, by the first bidirectional signal splitter/combiner, a first downstream signal of the two downstream signals to the CATV active downstream signal communication path;

supplying, by the first bidirectional signal splitter/combiner, a second downstream signal of the two downstream signals to the CATV passive signal communication path;

suppressing, by a MoCA signal frequency resection filter formed internal to the housing, a conduction of the MoCA signals in the MoCA frequency band from the first bidirectional signal splitter/combiner onto the CATV network; and allowing, by the MoCA signal frequency rejection filter, the CATV active upstream signal, the CATV passive downstream signal and the CATV passive upstream signal to pass onto the CATV network without impairment.

14. A method as defined in claim 13, further comprising:

creating a single upstream signal from the CATV active upstream and passive upstream signals supplied respectively by the CATV active upstream signal communication path and the CATV passive signal communication path and supplying the single created upstream signal to the CATV network; and traversing MoCA signals between the MoCA signal communication path and CATV passive signal communication path to conduct MoCA signals between MoCA interface devices connected at the active and passive ports.

15. A method as defined in claim 14, further comprising:

splitting the CATV active downstream signals and MoCA signals conducted respectively from the CATV active downstream signal communication path and the MoCA signal communication path into a plurality of downstream copies;

delivering each downstream copy to an active port;

combining the CATV active upstream signals and the MoCA signals conducted from the active ports into a single combined upstream signal; and applying the single combined upstream signal to the CATV active upstream signal communication path and to the MoCA signal communication path.

* * * * *